US011952823B2

(12) United States Patent
Wu et al.

(10) Patent No.: US 11,952,823 B2
(45) **Date of Patent: *Apr. 9, 2024**

(54) APPARATUS AND METHOD FOR DOOR CONTROL

(71) Applicant: CORNELLCOOKSON, LLC, Mountain Top, PA (US)

(72) Inventors: Zhizhuo Wu, Tempe, AZ (US); Ryan Carroll, Phoenix, AZ (US)

(73) Assignee: CornellCookson, LLC, Mountain Top, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/994,916

(22) Filed: Nov. 28, 2022

(65) Prior Publication Data

US 2023/0085922 A1 Mar. 23, 2023

Related U.S. Application Data

(63) Continuation of application No. 16/741,900, filed on Jan. 14, 2020, now Pat. No. 11,512,518.

(51) Int. Cl.
*G07C 9/10* (2020.01)
*E01F 13/04* (2006.01)
(Continued)

(52) U.S. Cl.
CPC .............. *E05F 15/73* (2015.01); *E01F 13/04* (2013.01); *E06B 9/68* (2013.01); *G07C 9/00174* (2013.01);
(Continued)

(58) Field of Classification Search
CPC ...... G01N 21/553; G01N 21/41; G01N 33/53; G01N 33/543; G01N 33/54373; G01N 33/553; E01F 13/04; E01F 13/044; E01F 13/08; E01F 13/12; E05Y 2900/106; E05Y 2900/11; E05Y 2900/132; E05Y 2400/36; E05F 15/73; E05F 15/76; E05F 2015/765; E05F 2015/767; E06B 2009/6818; E06B 2009/6827; E06B 9/68; G07C 9/00174; G07C 9/10; G07C 9/20; G07C 9/00896;
(Continued)

(56) References Cited

U.S. PATENT DOCUMENTS 9,922,549 B2 * 3/2018 Warren .................. G08C 17/02
2005/0206497 A1 9/2005 Tsui et al.
(Continued)

FOREIGN PATENT DOCUMENTS

EP 3584400 A1 12/2019

OTHER PUBLICATIONS

International Search Report and Written Opinion mailed in corresponding PCT/US2021/013071 dated Apr. 12, 2021, 10 pages.

*Primary Examiner* — Dionne Pendleton

(57) ABSTRACT

In example implementations, a method is provided. The method includes determining, by a processor, that a vehicle is approaching a door of a building based on a velocity vector of the vehicle, calculating, by the processor, a time of arrival of the vehicle at the door based on the velocity vector of the vehicle and a distance of the vehicle from the door, and controlling, by the processor, the door to begin opening at a time based on the time of arrival and an amount of time for the door to open such that the door is opened when the vehicle arrives at the door.

20 Claims, 5 Drawing Sheets

(51) Int. Cl.

| | |
|---|---|
| ***E05F 15/73*** | (2015.01) |
| ***E06B 9/68*** | (2006.01) |
| ***G07C 9/00*** | (2020.01) |
| ***G07C 9/20*** | (2020.01) |

(52) U.S. Cl.
CPC ................. *G07C 9/10* (2020.01); *G07C 9/20* (2020.01); *E05F 2015/765* (2015.01); *E05F 2015/767* (2015.01); *E05Y 2900/132* (2013.01); *E06B 2009/6818* (2013.01); *E06B 2009/6827* (2013.01)

(58) Field of Classification Search
CPC ............ Y10T 436/2575; G01C 21/206; G01C 21/165; G01C 21/20; G01C 21/3407; G01C 21/3453; G01C 21/3688; G01C 21/3691; G08C 17/02; G08C 2201/30; G08C 2201/91; G08C 2201/93; B60W 10/18; B60W 10/20; B60W 30/06; B60W 40/02; B62D 15/0285; G01S 13/003; G01S 13/56; G01S 17/36; G01S 17/894; G01S 17/931; G01S 19/49; G01S 19/53; G01S 5/14; G01S 7/006; G01S 7/415; G01S 7/4913; G05D 1/0212; G05D 1/0217; G05D 1/0246; G05D 1/0274; G05D 1/0276; G05D 1/0278; G05D 1/0291; G05D 2201/0211; G05D 2201/0212; G05D 2201/0213; G05D 2201/0216; G06F 3/04817; G06Q 10/083; G06Q 10/08355; G06Q 10/087; H04W 4/021; H04W 4/026; H04W 4/027; H04W 4/029; H04W 84/18

See application file for complete search history.

(56) References Cited

U.S. PATENT DOCUMENTS

| | | | | |
|---|---|---|---|---|
| 2015/0084750 | A1* | 3/2015 | Fitzgibbon ............. | G08C 17/02 340/12.29 |
| 2015/0251599 | A1 | 9/2015 | Koravadi | |
| 2018/0007507 | A1 | 1/2018 | Ghabra et al. | |
| 2020/0150283 | A1* | 5/2020 | Akpinar .................. | G01S 19/53 |
| 2021/0363715 | A1 | 11/2021 | Becker et al. | |
| 2022/0026519 | A1* | 1/2022 | Wu ......................... | G01S 7/006 |

* cited by examiner

APPARATUS AND METHOD FOR DOOR CONTROL

CROSS-REFERENCE TO RELATED APPLICATIONS

This application is a continuation of U.S. patent application Ser. No. 16/741,900 filed on Jan. 14, 2020, which is hereby incorporated by reference in its entirety.

BACKGROUND

Certain enterprise locations may use large doors that can be opened and closed as traffic comes into and out of the enterprise location. For example, industrial warehouses may have vehicles and people that frequently go in and out of the warehouse through certain doors. For a variety of different reasons (e.g., energy savings, security, and the like), the doors cannot remain opened. As a result, each time a vehicle or person goes through the door, the door is opened and closed.

The doors may include rolled steel doors that may be relatively heavy. The doors may take several seconds to open and close. Thus, each time an operator on a vehicle arrives at a door, the operator may wait several seconds for the door to open. Over a course of a working day, several weeks, and a year, this may add up to a large amount of time wasted on waiting for the door to open.

DETAILED DESCRIPTION

Examples described herein provide a system, apparatus, and method to automatically control a door. As noted above certain locations (e.g., industrial warehouses) may have vehicles and people that may frequently go into and out of the location via certain doors. However, for a variety of different reasons, the doors cannot remain open.

The doors may include commercial steel rolled doors that are relatively large and heavy. There are some automated systems to control operation of the commercial steel rolled door. However, these current systems require an operator to arrive at the door and then wait for the door to open. This can take several seconds. Over the course of a day, week, or year, the several seconds can add up to a large amount of time that is wasted on waiting for the door to open and close.

Examples herein provide a system that can automatically open and control a door based on a velocity of an approaching vehicle. For example, the system may include a network of sensors that can gather position information of the vehicle and then calculate how quickly the vehicle is moving. Based on the velocity of the vehicle, the system may automatically cause a door to begin opening such that the door is open when the vehicle arrives at the door.

The system may also include a virtual lane that includes an area where the velocity calculations may be initiated. The virtual lane may prevent false open signals (e.g., when a vehicle is approaching a shelf near the door, but not going out of the door). The virtual lane may also provide additional safety (e.g., when there is two way traffic through a door, the virtual lane may ensure the vehicle is exiting on the correct lane or side of the door).

Figure 1:
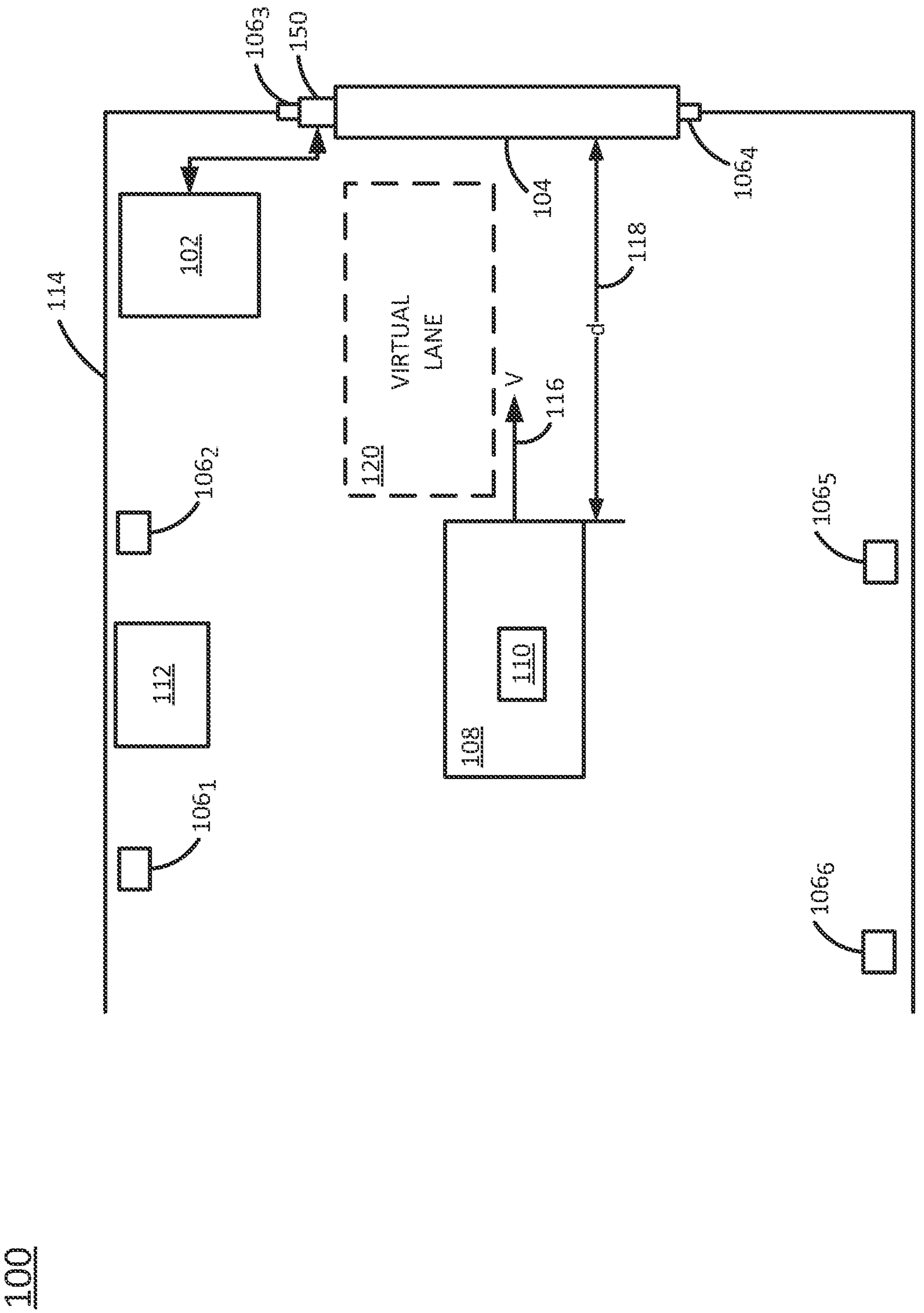
FIG. 1 is a block diagram of a top view of an example system for automated door control of the present disclosure.

FIG. 1 illustrates an example system 100 of the present disclosure. In one embodiment, the system 100 may be deployed in a location 114. The location 114 may be an enterprise location such as an industrial warehouse. The location 114 may have a door 104 that is controlled by a motor 150. The door 104 may be a steel rolled door that can be opened and closed by operation of the motor 150.

Although a single door 104 is illustrated in FIG. 1, it should be noted that the location 114 may include a plurality of different doors 104 at different locations around the location 114. Thus, the automated door control described herein may apply equally to any door 104 at the location 114.

In one embodiment, the system 100 may include a controller or server 102 that is communicatively coupled to the motor 150. The controller 102 may automatically activate or deactivate the motor 150 to open and close the door 104. As noted above, the location 114 may include many different doors 104 with respective motors 150. The controller 102 may be communicatively coupled to each door 104 or a plurality of controllers 102 may be deployed such that each door 104 is coupled to a respective controller 102.

In one embodiment, the system 100 may include a plurality of sensors $\mathbf{106}_1$ to $\mathbf{106}_6$ (also referred to herein individually as a sensor 106 or collectively as sensors 106). Although six sensors 106 are illustrated in FIG. 1, it should be noted that any number of sensors 106 (e.g., more than six or less than six) may be deployed.

In one embodiment, the sensors 106 may be any type of sensor that can collect, capture, measure, and the like, movement data and/or information associated with a vehicle 108. The vehicle 108 may be any type of motorized or non-motorized vehicle. For example, the vehicle 108 may be a driven forklift, a manually pushed hand cart, a motorized cart or car, and the like.

In one embodiment, the sensors 106 may be motion sensors that use a laser to measure time of flight. In one example, the sensors 106 may be image capturing devices. For example, an image capturing device may be a video camera that can capture consecutive images or motion video. The images or motion video may then be analyzed using available motion or image analysis techniques to calculate movement data of the vehicle 108.

In one embodiment, the sensors 106 may be communicatively coupled to the controller 102. The sensors 106 may be communicatively coupled to the controller 102 via a wired or wireless connection. Examples of wireless connections may include Wi-Fi, Blueooth, Zigbee, and the like.

In one embodiment, the sensors 106 may accurately track positioning of equipment or objects in the location 114 using an ultra-wideband (UWB) protocol. For example, the sensors 106 may use time of flight (TOF) or transit time methodology versus measurements of signal strength used in other types of sensors. The vehicle 108 may include a tag that can operate on battery power or power drawn from the vehicle 108. The tags can send information periodically to the sensors 106 that are in a fixed position. The running time of the light from the tag to the sensors 106 may use UWB for transmission. One or more sensors 106 can then calculate the distance of the vehicle 108 based on the information or light sent by the tag on the vehicle 108.

In one embodiment, with UWB technology, the distance between each sensor and each tag can be measured. The position coordinates of the vehicle 108 may then be calculated using a positioning algorithm and the distance between the tag and each sensor. With a variation of the coordinates, the movement of the tag on the vehicle 108 can be determined. The movement may include a velocity and a direction of the movement, as discussed in further details below.

In one embodiment, the controller 102 may receive data from the sensors 106. The controller 102 may then perform analysis on the data to determine whether to automatically open the door 104, as discussed in further details below. In one embodiment, the controller 102 may activate the motor 150 at a particular time to begin opening the door such that the door is open when the vehicle 108 arrives at the door 104. In other words, the controller 102 may control operation of the door 104 such that when the vehicle 108 intends to exit the location 114 through the door 104, the vehicle 108 may do so without waiting or stopping for the door 104 to open. Said another way, the door 104 may be opened to account for an amount of time to open the door 104 and a speed of the vehicle 108 such that the vehicle 108 may exit the location 114 without waiting. The calculations and analysis performed by the controller 102 to control operation of the motor 150 and the door 104 are discussed in further details below.

In one embodiment, system 100 may include a radio frequency (RF) tag reader 112. Although a single RF tag reader 112 is illustrated in FIG. 1, it should be noted that any number of RF tag readers 112 may be deployed in the location 114. The RF tag reader 112 may be communicatively coupled to the controller 102 via a wired or wireless connection. For example, the RF tag reader 112 may also be communicatively coupled to the controller 102 via a wireless protocol such as Zigbee or Wi-Fi.

The RF tag reader 112 may read an RF tag 110 located on the vehicle 108. The RF tag 110 may be a powered or a passive RF tag that contains information associated with the vehicle. The information may include a type of vehicle (e.g., a forklift, a motorized cart, a hand cart, a crane, and the like), which department the vehicle belongs to, security information associated with the vehicle, and the like. In one embodiment, the RF tag 110 may also function as the tag that emits light or information to the sensors 106 using UWB to calculate a time of flight, as described above.

In one embodiment, the RF tag reader 112 may read the RF tag 110 and send the information to the controller 102. The information may be used to determine if the vehicle 108 is authorized to exit through the door 104. Thus, if the vehicle 108 is not authorized, the controller 102 may prevent the door 104 from opening.

The information may also be used to provide other types of information. For example, the information may include vehicle information or operator information. The information may include an Internet protocol (IP) address of a communication module on the vehicle 108. As a result, if the vehicle 108 is moving too quickly, the controller 102 may send a signal or message to the vehicle 108 via the IP address. In another example, if the door 104 is malfunctioning or offline for maintenance, the controller 102 may send a message to the vehicle via the IP address read from the RF tag 110.

In one embodiment, the system 100 may include a virtual lane 120. The virtual lane 120 may be a predefined area where, upon detection of the vehicle 108 in the virtual lane 120, the controller 102 may begin analyzing the data received from the sensors 106. The controller 102 may calculate a velocity vector 116 and determine if the vehicle 108 is attempting to exit the location 114 via the door 104. As discussed in further details below, the velocity vector 116 may include a velocity component and a directional component. The directional component may indicate the intention of the vehicle 108.

If the controller 102 determines that the vehicle 108 is attempting to exit or enter through the door 104, the controller 102 may also calculate a distance 118 of the vehicle from the door 104. Based on the velocity vector 116, the distance 118, and an amount of time to open the door 104, the controller 102 may calculate a time at which the controller 102 may activate the motor 150 to begin opening the door 104.

To illustrate, the vehicle 108 may be moving at 10 meters per second (m/s). The vehicle 108 may be approximately 100 meters from the door 104. The door 104 may take 4 seconds to open. Thus, the vehicle 108 may arrive at the door 104 in 10 seconds. Thus, the controller 102 should activate the motor 150 to begin opening the door 104 in 6 seconds, such that the door 104 is completely opened when the vehicle 108 arrives at the door 104 in 10 seconds.

In one embodiment, the virtual lane 120 may allow the controller 102 to operate more efficiently. For example, the sensors 106 may be continuously collecting movement data/information from a plurality of different vehicles 108. For example, although a single vehicle 108 is illustrated in FIG. 1, a plurality of vehicles 108 may be present and moving simultaneously in the location 114. The sensors 106 may collect movement data from the vehicles and send the data to the controller 102.

The virtual lane 120 may also allow movement information of vehicle 108 to be filtered and/or simplified to velocity vectors to regulated lanes. Filtering may account for measurement error from the sensors 106 and human driving deviations or errors. The movement information along the virtual lane 120 can be used to determine the intention of the driver. This may help to reduce the data obtained from the sensors 106.

Without the virtual lane 120, the controller 102 may be required to continually process thousands of data points of many different vehicles. This can require a large amount of processing power and consume large amounts of energy. However, in the present disclosure, the controller 102 may be activated to begin performing calculations when the vehicle 108 is detected within the virtual lane 120. For example, the controller 102 may take the motion data of the vehicle 108 in the virtual lane 120 that is collected by the sensors 106 and begin calculating the velocity vector 116, the distance 118, and so forth, as described above.

In one embodiment, the virtual lane 120 may also help prevent false positives. For example, the vehicle 108 may be parking or collecting a package that is near the door 104. However, with the virtual lane 120, the door 104 may not be accidentally opened if the vehicle 108 were to move to the right side of the door 104 when the virtual lane 120 is located on a left side of the door 104.

In one embodiment, the virtual lane 120 may be combined with a predefined route. For example, the vehicle 108 may be collecting garbage that is near the door 104. Paths to the garbage near the door 104 in conjunction with the virtual lane 120 may be predefined such that the door 104 may be opened to allow the vehicle 108 to then exit through the door 104 to a dumpster that is outside of the location 114. In other words, the intention of the vehicle 108 may be detected to be associated with a predefined route once the vehicle 108 enters the virtual lane 120. Thus, although the vehicle 108 does not initially move towards the door 104, the controller 102 may open the door 104 such that the door 104 is opening as the vehicle 108 is approaching the door 104 after picking up the garbage near the door 104.

In one embodiment, the virtual lane 120 may also provide additional safety. For example, the door 104 may allow two-way traffic. In one embodiment, vehicles 108 may exit on a left side of the door 104 and vehicles 108 may enter on a right side of the door 104. As a result, if a vehicle 108 attempts to exit on the right side of the door 104, the vehicle 108 may not be in the virtual lane 120. As a result, the controller 102 may not be activated to perform calculations and control operation of the door. This may prevent another vehicle which may be entering through the door 104 from crashing into the vehicle 108 which may be trying to exit through the door 104.

In one embodiment, the boundaries of the virtual lane 120 may be predefined and stored in the controller 102. The controller 102 may determine if any of the motion data (that may include location data) from any of the sensors 106 associated with the vehicle 108 is within the predefined boundaries of the virtual lane 120 stored in the controller 102. In another embodiment, a subset of the sensors 106 may be focused on the virtual lane 120. Thus, when the subset of the sensors 106 detects motion within the area of focus (e.g., associated with the boundaries of the virtual lane 120), the controller 102 may be activated.

As noted above, the controller 102 may calculate the velocity vector 116 based on the data from the sensors 106. The velocity vector 116 may include two components or values. One value may be the velocity or distance traveled per time (e.g., m/s, feet per second (ft/s), miles per hour (mph), and the like). A second value may be a directional value or component. The controller 102 may calculate the velocity vector 116 and determine whether the vehicle 108 is attempting to exit through the door 104 based on the directional component of the velocity vector 116.

In one embodiment, the velocity vector 116 may be calculated based on the data from the sensors 106. For example, the velocity may be calculated based on data from one or more sensors 106. For example, the sensors 106 may be motion sensors that use lasers to calculate time of flight data using UWB, as described above. Based on consecutive readings, the sensors 106 may calculate the velocity vector 116 of the vehicle 108. The information may then be sent to the controller 102.

In one embodiment, the readings from the sensors 106 may be transmitted to the controller 102, and the controller 102 may calculate an estimated velocity. For example, the sensor $\mathbf{106}_1$ may measure a first distance of 10 feet to the vehicle 108 and a second distance of 20 feet to the vehicle 108 one second apart. Thus, the controller 102 may calculate that the vehicle 108 is moving at approximately 10 ft/s.

In another example, the first sensor $\mathbf{106}_1$ and the second sensor $\mathbf{106}_2$ may be 10 feet apart. The first sensor $\mathbf{106}_1$ may detect the vehicle 108 at time t=0. The second sensor $\mathbf{106}_2$ may detect the vehicle 108 at time t=5. Thus, the controller 102 may calculate that the vehicle 108 is moving at a velocity of 2 ft/s (10 feet/5 seconds).

In one embodiment, the direction may also be determined by the sensors 106. For example, the sensors $\mathbf{106}_1$, $\mathbf{106}_2$, $\mathbf{106}_5$, and $\mathbf{106}_6$ may collect data that indicates over time that the vehicle 108 is moving further away. However, the sensors $\mathbf{106}_3$ and $\mathbf{106}_4$ may collect data that indicates over the same period of time that the vehicle 108 is moving closer. As a result, the controller 102 may calculate that the vehicle 108 is moving towards the door 104. Also, when the direction is determined to be towards the door, the controller 102 may determine that the vehicle 108 is attempting to exit through the door 104.

In another embodiment, the sensors 106 may be image capturing devices. The sensors 106 may capture consecutive images of the vehicle 108. Pixel level analysis may be performed on the images to calculate directional vectors of each pixel to determine a direction in which the vehicle 108 is moving. In addition, based on the frame rate or image capture rate of the image capturing device and a distance traveled of a reference pixel between consecutive images, the controller 102 may calculate an estimated velocity of the vehicle 108.

Thus, the controller 102 may process the data collected by the sensors 106 when triggered by motion detected within the virtual lane 120. The controller 102 may calculate a velocity vector 116 using the data from the sensors 106. Based on the velocity vector 116, the controller 102 may determine if the vehicle 108 is attempting to exit through the door 104. If so, the controller 102 may calculate a time at which to begin opening the door 104 based on the velocity of the vehicle 108, a distance 118 of the vehicle from the door 104, and a time to open the door 104.

Figure 2:
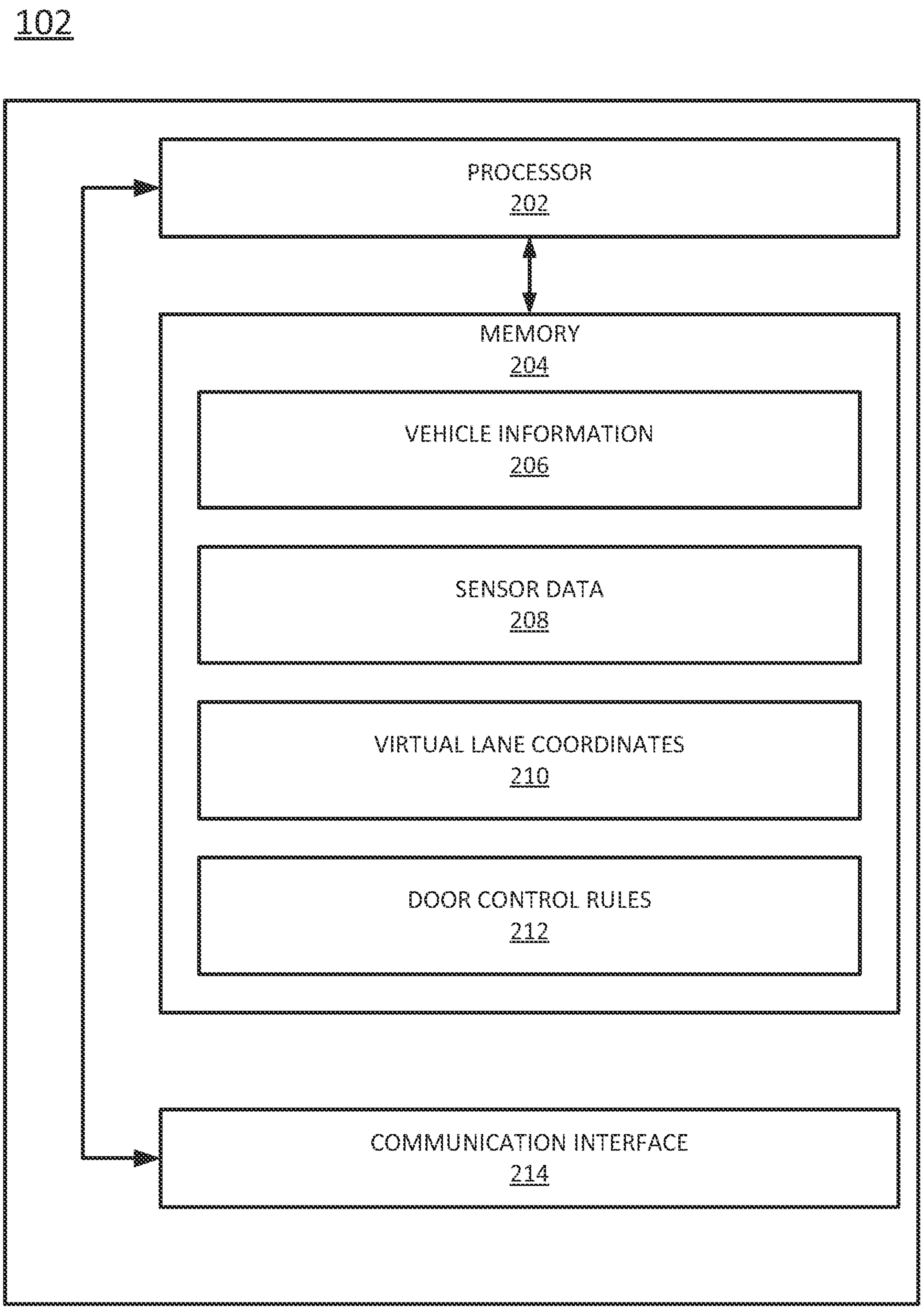
FIG. 2 is a block diagram of an example apparatus for automated door control of the present disclosure.

FIG. 2 illustrates a block diagram of the controller 102. In one embodiment, the controller 102 may be a server or a computing device. The controller 102 may include a processor 202, a memory 204, and a communication interface 214. The processor 202 may be communicatively coupled to the memory 204. The processor 202 may execute instructions stored in the memory 204 to perform the functions described herein.

In one embodiment, the memory 204 may be any type of non-transitory computer readable storage medium. For example, the memory 204 may be a hard disk drive, a solid state drive, a read only memory, a random access memory, and the like.

In one embodiment, the memory 204 may store vehicle information 206, sensor data 208, virtual lane coordinates 210, and door control rules 212. In one embodiment, the vehicle information 206 may include information associated with vehicles 108, which are allowed to exit through identified doors 104. For example, the vehicle information received from the RF tag reader 112 may be compared to the vehicle information 206 to determine a corresponding the vehicle 108 is authorized to exit through a particular door 104. For example, some vehicles 108 may be too big to fit through a particular door 104. Other vehicles 108 may not be authorized to exit through a particular door for security or safety reasons.

In one embodiment, the sensor data 208 may store the data received from the sensors 106. In one embodiment, the sensor data 208 may be temporarily stored. For example, the sensor data 208 may be deleted every hour to prevent too much data from being stored. In one embodiment, the sensor data 208 may not be stored until the vehicle 108 is detected in the virtual lane 120 to save memory space in the memory 204. The processor 202 may then access the sensor data 208 to begin calculating the velocity vector 116, distance 118, and so forth.

In one embodiment, the virtual lane coordinates 210 may store the boundary of the virtual lane 120. The virtual lane coordinates 210 may be predefined and may include a range of values (e.g., within a two dimensional coordinate space associated with the location 114). The motion data from the sensors 106 may be continuously compared to the virtual lane coordinates 210. For example, the location data obtained from the data captured by the sensors 106 may be compared to the range of values stored in the virtual lane coordinates 210. If the location data is within the range of values, then the vehicle 108 may be determined to be in the virtual lane 120. The processor 202 may be activated, the data associated with the vehicle 108 in the virtual lane 120 may be stored in the sensor data 208, and the processor may begin performing additional calculations with the sensor data 208, as described above.

It should be noted that FIG. 2 has been simplified for ease of explanation. The controller 102 may include additional components that are not shown. For example, the controller 102 may include a display, a graphical user interface, input devices (e.g., a keyboard, a mouse, a trackpad, a touch-screen, and the like), other types of information stored in the memory 204, and the like.

Figure 3:
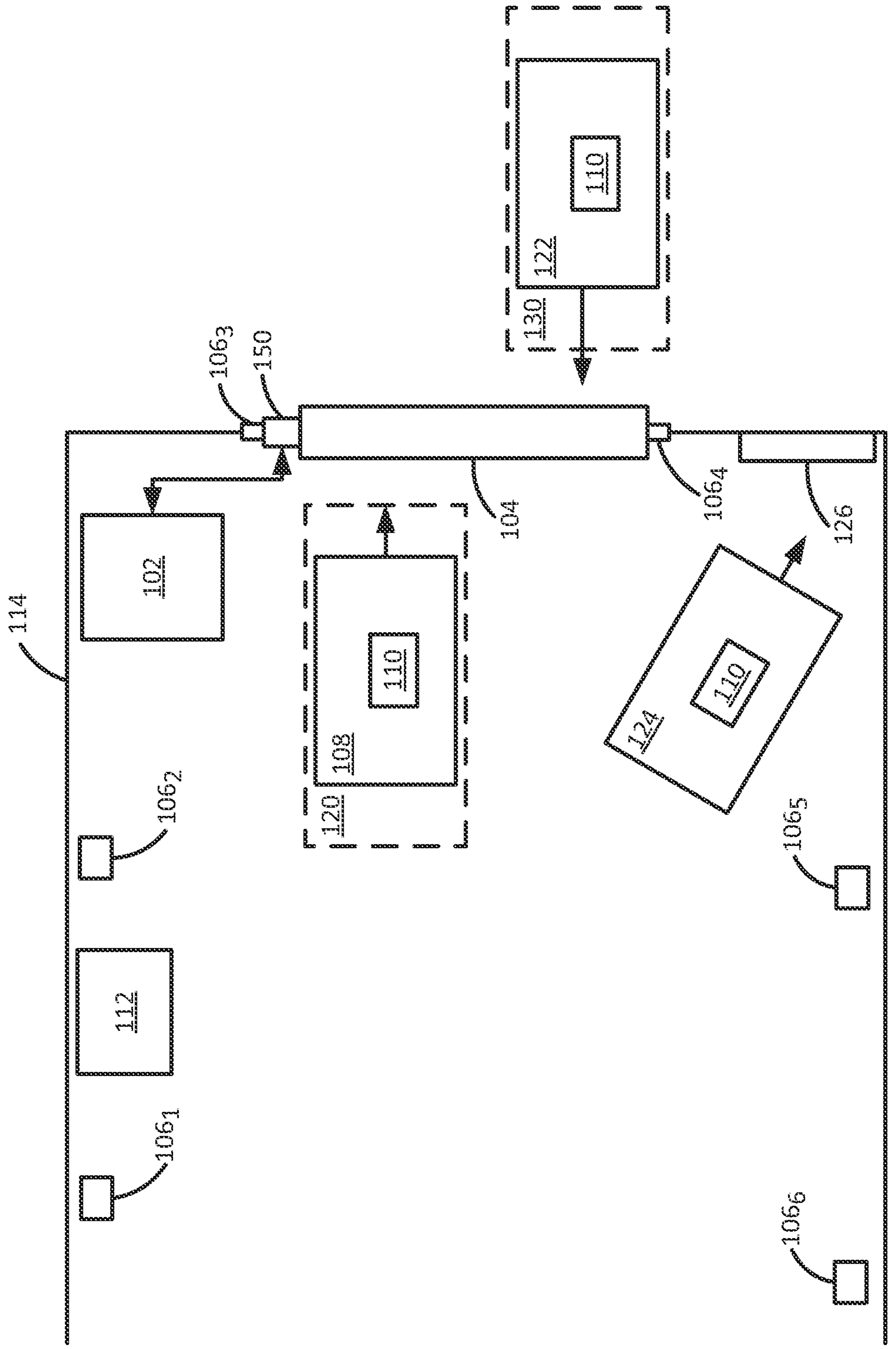
FIG. 3 is a block diagram of an example of the system for automated door control in operation.

FIG. 3 illustrates an example operation of the system 100. FIG. 3 illustrates the location 114 including all of the components of the system 100 illustrated in FIG. 1 and discussed above. For example, the system 100 may include the controller 102, the door 104 coupled to a motor 150, a plurality of sensors 106, and an RF tag reader 112.

In a first example, the vehicle 108 may be a forklift driven by an operator. The operator may want to exit the location 114. Thus, the vehicle 108 may move towards the door 104 and into the virtual lane 120. The location 114 may include other vehicles 122 and 124. Thus, the sensors 106 may be simultaneously collecting movement data of many different vehicles 108, 122, and 124 in and around the location 114.

However, when the vehicle 108 enters the virtual lane 120, the controller 102 may be activated to begin calculating a velocity vector based on data being collected from the sensors 106 for the vehicle 108. The controller 102 may then determine a time at which to begin opening the door 104. Based on the velocity vector of the vehicle 108 and the distance to the door 104, the controller 102 may open the door such that the vehicle 108 may exit without having to wait for the door 104 to open. In other words, the vehicle 108 may maintain a constant velocity in a current direction without having to slow down to wait for the door 104 to be opened. Other data which may be utilized may include the door height, motor force, motor speed, and the height of the vehicle.

In another example, the door 104 may allow two-way traffic. Thus, another vehicle 122 may be trying to enter the location 114 through the door 104 and the vehicle 108 may be trying exit the location 114 through the door 104. Another virtual lane 130 may be predefined opposite the virtual lane 120 on the opposite side of the door 104, as shown in FIG. 3. The virtual lane 130 may operate and function similar to the virtual lane 120.

As a result, the door 104 may not be opened unless both the vehicle 108 and the vehicle 122 are in the respective virtual lanes 120 and 130. Thus, controller 102 may keep the door 104 closed if the sensors 106 detect the vehicle 122 approaching directly in front of the vehicle 108. Thus, a collision may be avoided. In one embodiment, the controller 102 may transmit a message to both the vehicle 108 and the vehicle 122 indicating why the door 104 is not opening. As noted above, the vehicles 108 and 122 may include communication modules. The IP addresses for the communication modules can be read from the RF tags 110, and the controller 102 may address the message to the respective IP addresses.

In another example, the vehicle 124 may be approaching the door 104. The vehicle 124 may be attempting to pick up an item from a shelf 126 that is located adjacent to the door 104. In one embodiment, the vehicle 124 may initially have started in the virtual lane 120. As a result, the controller 102 may be activated. The controller 102 may calculate the velocity vector of the vehicle 124. However, the directional component of the velocity vector may indicate that the vehicle 124 is turning towards the shelf 126. Thus, the controller 102 may determine that the vehicle 124 is not attempting to exit through the door 104 and may keep the door 104 in a closed position. As a result, a false positive may be avoided and the door 104 may remain in a closed position.

In another example, a predefined route may be associated with the movement towards the shelf 126. For example, objects on the shelf 126 may be picked up and taken to a particular location outside of the location 114. Thus, the vehicle 124 may be approaching the door 104 to pick up an item on the shelf 126. The controller 102 may calculate the velocity vector, or receive the velocity vector from the sensors 106, of the vehicle 124. The directional component of the velocity vector may indicate that the vehicle 124 is turning towards the shelf 126. The controller 102 may recognize that this movement is associated with a predefined route. Thus, the controller 102 may continue to track movement of the vehicle 124 and may determine a time at which to begin opening the door 104.

It should be noted that the above scenarios are provided as examples and should not be considered limiting. Other scenarios may be understood to be part of the present disclosure and within the scope of the present disclosure.

Figure 4:
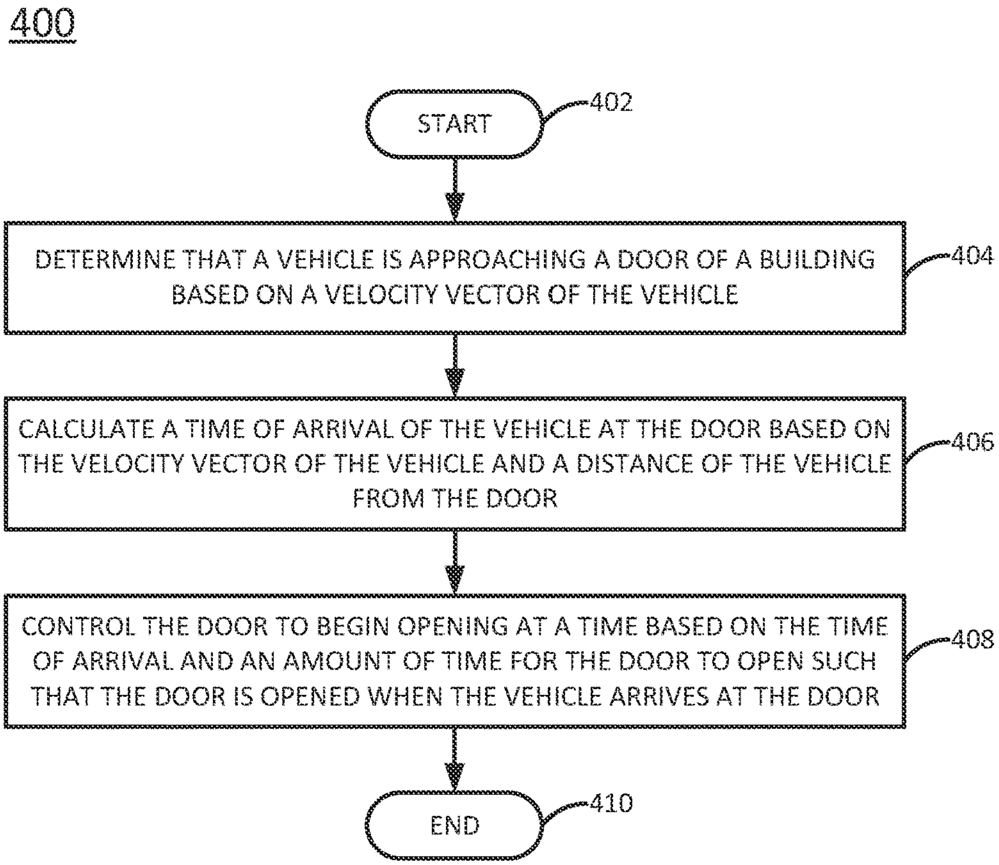
FIG. 4 is a flow chart of an example method for controlling a door of the present disclosure.

FIG. 4 illustrates a detailed flow chart of an example method for controlling a door of the present disclosure. In an example, the method 400 may be performed by the server or controller 102, or by the apparatus 500 illustrated in FIG. 5, and described below.

At block 402, the method 400 begins. At block 404, the method 400 determines that a vehicle is approaching a door of a building based on a velocity vector of the vehicle. For example, the vehicle may be trying to exit or enter the building through the door. In one embodiment, a processor or controller may be activated when the vehicle enters a virtual lane. When activated, the processor may analyze motion data or information collected from sensors deployed throughout the building.

In one embodiment, the velocity vector may include a velocity or speed component and a directional component. The directional component may indicate whether the vehicle is attempting to exit the building, trying to turn towards a shelf located near the door, or the vehicle was moving across the building, but happened to cut through the virtual lane.

In one embodiment, if it is determined that the vehicle is attempting to exit the building through the door, the processor may determine if the vehicle is authorized to exit through the door. For example, the vehicle may have an RF tag that can be read by an RF tag reader. The RF tag may include information associated with the vehicle. The information may be compared to stored information to determine if the vehicle is authorized. If the vehicle is not authorized to exit through the door, a message or notification may be transmitted to the vehicle.

At block 406, the method 400 calculates a time of arrival of the vehicle at the door based on the velocity vector of the vehicle and a distance of the vehicle from the door. For example, the velocity vector may include a velocity component, as noted above. The distance may be determined based on data collected from the sensors. For example, the vehicle may be moving at 5 ft/s and the sensors may measure that the vehicle is 30 feet from the door. Thus, the time of arrival of the vehicle may be 6 seconds.

At block 408, the method 400 controls the door to begin opening at a time based on the time of arrival and an amount of time for the door to open such that the door is opened when the vehicle arrives at the door. Using the example above, the door may take 4 seconds to open. Thus, the processor may begin opening the door in 2 seconds such that the door may be opened when the vehicle arrives at the door at its current velocity. For example, after 2 seconds, the vehicle would reach the door in 4 seconds. Since the door takes 4 seconds to open, the door would be opened when the vehicle arrived at the door.

In one embodiment, the method 400 may also determine if the vehicle has cleared the door. Once the vehicle has cleared the door, the door may be controlled to close in response to the vehicle being clear of the door. As a result, the method 400 may automatically open and close the door based on the movement of the vehicles. At block 410, the method 400 ends.

Figure 5:
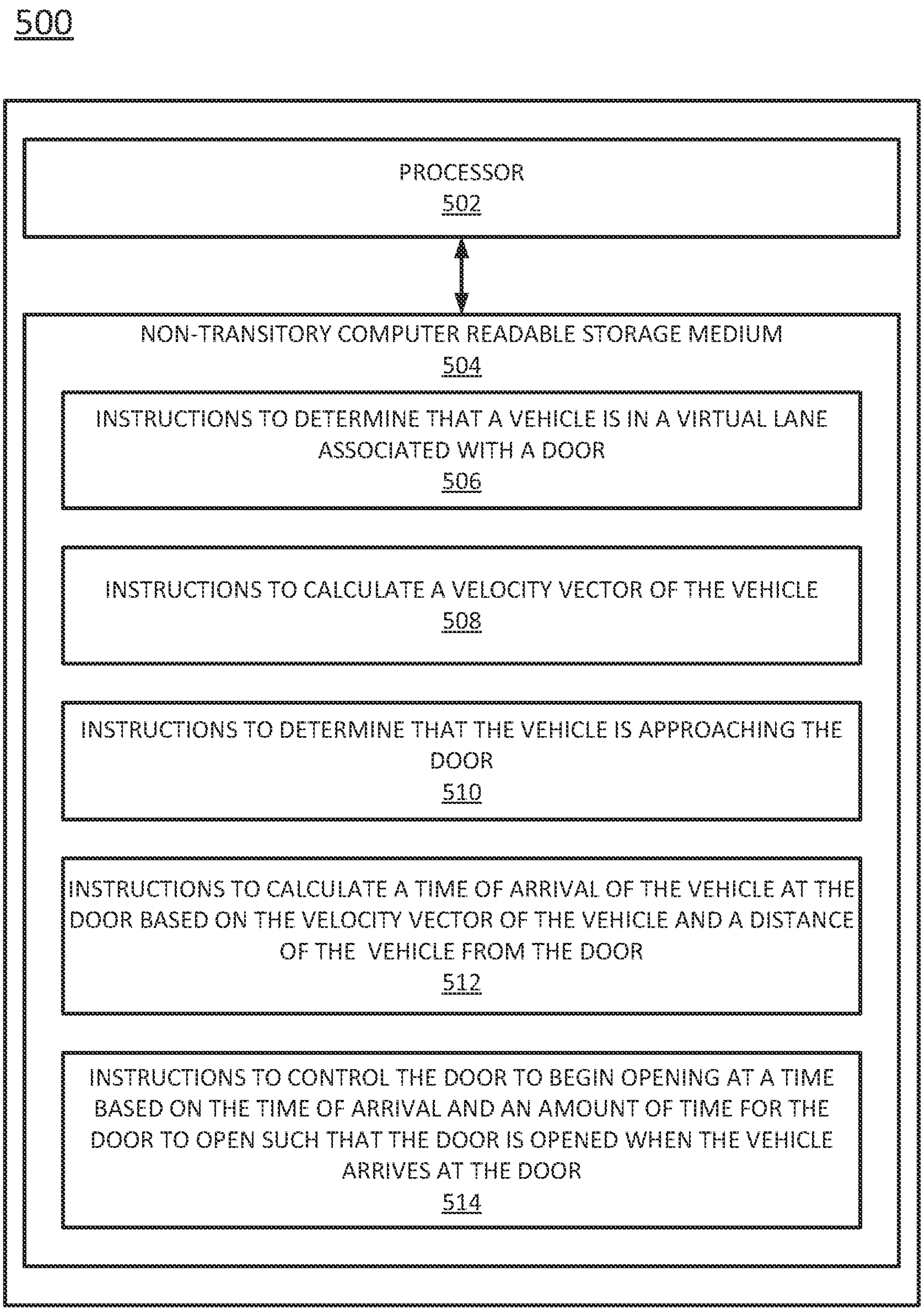
FIG. 5 is a block diagram of an example non-transitory computer readable storage medium storing instructions executed by a processor to control a door of the present disclosure.

FIG. 5 illustrates an example of an apparatus 500. In an example, the apparatus 500 may be the server or controller 102. In an example, the apparatus 500 may include a processor 502 and a non-transitory computer readable storage medium 504. The non-transitory computer readable storage medium 504 may include instructions 506, 508, 510, 512, and 514 that, when executed by the processor 502, cause the processor 502 to perform various functions.

In an example, the instructions 506 may include instructions to determine that a vehicle is in a virtual lane associated with a door. The instructions 508 may include instructions to calculate a velocity vector of the vehicle. The instructions 510 may include instructions to determine that the vehicle is approaching the door. The instructions 512 may include instructions to calculate a time of arrival of the vehicle at the door based on the velocity vector of the vehicle and a distance of the vehicle from the door. The instructions 514 may include instructions to control the door to begin opening at a time based on the time of arrival and an amount of time for the door to open such that the door is opened when the vehicle arrives at the door.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:

determining, by a processor, that a vehicle is approaching a door of a building based on a velocity vector of the vehicle, wherein the velocity vector is calculated based on data received from at least one sensor, wherein the determining is performed when the vehicle is determined to be within a virtual lane associated with the door;

calculating, by the processor, a time of arrival of the vehicle at the door based on the velocity vector of the vehicle and a distance of the vehicle from the door; and controlling, by the processor, the door to begin opening at a time based on the time of arrival and an amount of time for the door to open such that the door is opened when the vehicle arrives at the door.

2. The method of claim 1, wherein the virtual lane is associated with a predefined route.

3. The method of claim 1, further comprising:

determining, by the processor, that vehicle information associated with the vehicle is authorized to exit through the door before controlling the door to begin opening.

4. The method of claim 3, wherein the vehicle information is received from a radio frequency (RF) tag reader that reads an RF tag located on the vehicle.

5. The method of claim 1, wherein the velocity vector comprises a velocity and a direction of the vehicle.

6. The method of claim 1, wherein the at least one sensor comprises a laser on the vehicle to measure time of flight.

7. The method of claim 1, wherein the at least one sensor comprises a sensor located in a fixed location within the building and a tag located on the vehicle, wherein the data comprises time of flight measurements using a ultra-wide band (UWB) protocol.

8. The method of claim 1, wherein the at least one sensor performs a transit time methodology versus measurements of signal strength to calculate the velocity vector.

9. The method of claim 1, wherein the data comprises image data received from the at least one sensor.

10. A system, comprising:

a door located in a building;

a motor to control operation of the door;

a controller communicatively coupled to the motor to control operation of the motor to open and close the door; and at least one sensor communicatively coupled to the controller to collect movement data of a vehicle, wherein the controller is to begin calculating a velocity vector of the vehicle when the vehicle is determined to be within a virtual lane associated with the door, wherein the velocity vector of the vehicle is calculated based on the movement data and the controller is to cause the motor to begin opening the door at a time based on a time of arrival of the vehicle at the door that is calculated from the velocity vector and a distance of the vehicle from the door, and based on an amount of time for the door to open such that the door is opened when the vehicle arrives at the door.

11. The system of claim 10, wherein the at least one sensor comprises a laser on the vehicle to measure time of flight.

12. The system of claim 10, wherein the at least one sensor comprises a sensor located in a fixed location within the building and a tag located on the vehicle, wherein the movement data comprises time of flight measurements using a ultra-wide band (UWB) protocol.

13. The system of claim 12, wherein the tag comprises a radio frequency (RF) tag located on the vehicle.

14. The system of claim 13, further comprising:

an RF tag reader to read the RF tag located on the vehicle.

15. The system of claim 14, wherein the RF tag contains vehicle information to determine whether the vehicle is authorized to exit through the door.

16. The system of claim 10, wherein the at least one sensor further comprises an image capturing device to capture image data of the vehicle, wherein the movement information is calculated based on analysis of the image data.

17. A non-transitory computer readable storage medium encoded with instructions executable by a processor, the non-transitory computer-readable storage medium comprising:

instructions to determine that a vehicle is in a virtual lane associated with a door of a building;

instructions to activate a controller to calculate a velocity vector of the vehicle, wherein the velocity vector is calculated based on data received from at least one sensor;

instructions to determine that the vehicle is approaching the door;

instructions to calculate a time of arrival of the vehicle at the door based on the velocity vector of the vehicle and a distance of the vehicle from the door; and instructions to control the door to begin opening at a time based on the time of arrival and an amount of time for the door to open such that the door is opened when the vehicle arrives at the door.

18. The non-transitory computer readable storage medium of claim 17, wherein the at least one sensor comprises a laser on the vehicle to measure time of flight.

19. The non-transitory computer readable storage medium of claim 17, wherein the at least one sensor comprises a sensor located in a fixed location within the building and a tag located on the vehicle, wherein the data comprises time of flight measurements using a ultra-wide band (UWB) protocol.

20. The non-transitory computer readable storage medium of claim 17, wherein the data comprises image data received from the at least one sensor.

* * * * *